US006385650B1

(12) United States Patent
Skog et al.

(10) Patent No.: US 6,385,650 B1
(45) Date of Patent: *May 7, 2002

(54) ARRANGEMENT AND METHOD RELATING TO INFORMATION MANAGING SYSTEMS

(75) Inventors: Robert Skog, Sollentuna; Jonas Hasselberg, Stockholm, both of (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/988,125

(22) Filed: Dec. 10, 1997

Related U.S. Application Data (63) Continuation of application No. PCT/SE96/00556, filed on Jun. 10, 1996.

(30) Foreign Application Priority Data

Jun. 16, 1995 (SE) .............................................. 9502192

(51) Int. Cl.[7] .............................................. B06F 15/167
(52) U.S. Cl. ...................... 709/226; 709/226; 709/300; 709/303; 709/317; 707/103 Z
(58) Field of Search ................ 709/300, 303, 709/315, 316, 317, 223, 226; 707/103 Y, 103 Z (56) References Cited

U.S. PATENT DOCUMENTS 5,291,583 A * 3/1994 Bapat ........................ 395/500

(List continued on next page.)

FOREIGN PATENT DOCUMENTS

WO   WO94/06232   3/1994

OTHER PUBLICATIONS

Jerry Rosenberg, Computers, Information Processing & Telecommunications, p. 632, 1984.*

Keith McCloghrie, RFC 2037, pp. 1–31, Oct. 1996.*

Leslie Daigle, RFC 2016, pp. 1–19, Oct. 1996.*

Fred Baker, RFC 1406, pp. 1–44, Jan. 1993.*

International Search Report corresponding to International Application No. PCT/SE/00756, mailed Oct. 16, 1996.

Kantola, M. et al., "Development of TMN to a Family of Switching network Elements", International Switching Symposium, vol. 1, pp. 75–79, Oct. 1992.

Widl, W., "CCITT:s Standarisering av driftstodsnat", Ericsson Review, vol. 2, pp. 34–51, 1991.

Mazumdar, S., "Design of Protocol Independent Management Agent to Support SNMP and CMIP Queries", Inernational Symposium on Integrated Network, pp. 377–388, Apr. 1993.

(List continued on next page.)

Primary Examiner—Mark H. Rinehart
Assistant Examiner—Stephen Willett
(74) Attorney, Agent, or Firm—Burns, Doane, Swecker & Mathis, L.L.P.

(57) ABSTRACT

A system has a number of managing systems managing a number of managed systems including a number of managed objects of one or more different types representing resources. The managed objects are arranged in a management information tree structure. Type data on managed objects is stored and algorithms are used to provide information on mapping between managed objects and resources and/or information about sub-trees of the naming tree.

30 Claims, 4 Drawing Sheets

U.S. PATENT DOCUMENTS

| | | | | |
|---|---|---|---|---|
| 5,471,399 A | * | 11/1995 | Tanaka et al. | 364/491 |
| 5,519,868 A | * | 5/1996 | Allen et al. | 395/700 |
| 5,550,971 A | * | 8/1996 | Brunner et al. | 395/161 |
| 5,560,005 A | * | 9/1996 | Hoover et al. | 395/600 |
| 5,581,765 A | * | 12/1996 | Munroe et al. | 395/677 |
| 5,586,255 A | * | 12/1996 | Tanaka et al. | 395/200.01 |
| 5,600,776 A | * | 2/1997 | Johnson et al. | 395/326 |
| 5,692,180 A | * | 11/1997 | Lee | 395/610 |
| 5,696,697 A | * | 12/1997 | Balu et al. | 364/514 |
| 5,724,575 A | * | 3/1998 | Hoover et al. | |
| 5,822,569 A | * | 10/1998 | McPartlan et al. | 395/500 |
| 5,838,965 A | * | 11/1998 | Kavanagh et al. | 395/614 |
| 5,842,219 A | * | 11/1998 | High, Jr. et al. | 707/103 |
| 5,850,511 A | * | 12/1998 | Stoecker et al. | 395/183.14 |
| 5,860,004 A | * | 1/1999 | Fowlow et al. | 395/701 |
| 5,870,749 A | * | 2/1999 | Adusumilli | 707/101 |
| 5,872,973 A | * | 2/1999 | Mitchell et al. | |
| 5,907,696 A | * | 5/1999 | Stilwell et al. | 395/500 |
| 5,941,978 A | * | 8/1999 | Finni | 712/28 |
| 5,983,233 A | * | 11/1999 | Potonniee | |
| 5,995,753 A | * | 11/1999 | Walker | 395/702 |
| 6,018,743 A | * | 1/2000 | Xu | |
| 6,041,318 A | * | 3/2000 | Danford-Klein et al. | |
| 6,047,289 A | * | 4/2000 | Thorne et al. | |
| 6,081,838 A | * | 6/2000 | Toshihara et al. | 709/223 |

OTHER PUBLICATIONS

CCITT(now ITU–T) Recommendation M.3010 (ch.3), Oct. 1992.

"Information Technology Open Systems Interconnection Systems Management Overview", CCITT Recommendations x.701, Geneva, 1992.

"Information Technology—Open Systems Interconnection Structure of Management Information: Management Information Model", CCITT Recommendations x.702, Jan. 1992.

International Search Report corresponding to International Application No. PCT/SE/00756, mailed Oct. 16, 1996.

* cited by examiner

ARRANGEMENT AND METHOD RELATING TO INFORMATION MANAGING SYSTEMS

This application is a continuation of International Application No. PCT/SE96/00756, filed Jun. 10, 1996, which designates the United States.

BACKGROUND

The present invention relates to a system comprising a number of managing systems and a number of managed systems which are managed by said managing system. Each managed system comprises a number of managed objects being of one or more different types. The managed objects represent or manage resources and the managed objects are arranged in a management information tree structure also called a naming tree structure having a root and a number of sub-trees.

The invention also relates to a managed system which comprises a number of managed objects of one or more types representing/managing a number of resources wherein the managed objects are arranged in a naming tree structure comprising the instance names of the managed objects. Still further the invention relates to a telecommunications system with a number of managing systems each managing a number of managed systems with a number of managed objects which represent resources. The managed objects are arranged in a naming tree structure with a number of sub-trees.

The invention also relates to methods for mapping between managed objects of managed systems and resources which are managed or represented by the managed objects and for providing information relating to the sub-tree of the naming tree structure.

System management is known from the fields of data communication and telecommunications. CCITT (now ITU-T) Recommendation M.3010 relates to telecommunications management networks and CCITT Recommendations X.701 and X.720 relate to systems management and management information models of data communication networks.

In a number of known systems managed systems comprise network elements and managing systems are known as operations systems which are used for monitoring and controlling purposes of the equipment and the services which are provided by the network elements.

In some telecommunications systems a network element may be connected to the rest of the telecommunication network via an exchange terminal within the network element which in turn may communicate over a PCM (pulse code modulated) link. The network element is controlled and monitored from an operations system which is connected to the network element over the Q3-interface. In order to provide for the controlling or monitoring of the network element managed objects are created e.g. comprising subscriber data for subscribers.

The managed objects are designed for the operations systems and they show those parts of the network element which are to be monitored and controlled from the operations systems. The internal working within the network element is not interesting to an operations system and this is therefore not shown to the operations systems. In practice there are a number of standardized managed objects for various traffic applications which means that network elements from different vendors can be monitored and controlled in a similar manner.

However, for example for switching network elements, seen from the management point of view, there may be an enormous amount of managed objects such as for example millions of managed objects. Therefore, in order to keep track of all the managed objects and to make it possible to give them all a unique name, the managed objects are kept in a tree structure called a naming tree or a management information tree, c.f. CCITT X.720. The naming tree forms the management view of a network element and the relationships forming the naming tree are denoted containment relations. A containment relationship means that a managed object of one class can contain other managed objects of the same or different classes and it is a relationship between managed object instances. A managed object is only contained within one containing managed object and containing managed objects may themselves be contained in other managed objects. The containing relationship is used for naming managed objects. Managed objects which are named in the terms of another object are denoted sub-ordinate objects of the other managed object and a managed object which establishes the name in question for other objects is called a superior managed object of these other objects which then form sub-ordinate objects. The highest level of the naming tree is denoted a root and it is an object having no associated properties.

All managed objects are given an instance name upon creation. All managed objects sub-ordinated another managed object must have different instance names which means that the instance name thus not have to be unique within the naming tree but two or more managed objects can have the same instance name on condition that they are sub-ordinated different managed objects, i.e. that they have different "parents". Furthermore, every managed object has a distinguished name. This name is unique within the naming tree and the naming starts from the root of the naming tree and ends with the instance name of the managed object. Upon interaction with managed objects the actual traffic resources in the managed object, e.g. the network element, are manipulated. In order to enable manipulation of a resource, a mapping between the external name, i.e. the distinguished name, and an internal name, i.e. the name of the resource, is required and for management operations both resource mapping information and information about sub-trees of the naming tree is required.

In today known systems, the mapping of an external managed object name to an internal resource name and the retrieving of sub-trees is carried out with the use of tables, see e.g. "Design of Protocol Independent Management Agent to Support SNMP and CMIP Queries" by Subrata Mazumdar, International Symposium on Integrated Network, April 1993. In "Development of TMN to a Family of Switching Networks Elements" by M. Kantola et al, International Switching Symposium, Vol. 1 October 1992 is merely submitted that access to the information is needed, i.e. the information that is needed to associate each operation, object instance and attribute operated on to the appropriate resource in various DX 200 computer units. Nothing is however said about how this is provided. For performance reasons these tables are stored in random access memories RAM. However, if the number of managed objects is very high, the tables that are required need to be large. For example in a GSM telecommunications network having a Home Location Register including about 2 million subscribers the number of managed objects will be more than 50 millions and the tables will require approximately 5 Gbyte of RAM (this of course depends on the implementation; the estimation merely being given for illustrative purposes). The memory consumption of the two tables containing mapping and naming tree information is proportional to the number of managed objects. Moreover, the performance depends on how the access to the tables is provided etc. It is thus obvious that for large managed systems (e.g. network elements) comprising a high number of managed objects, the known solutions are unsatisfactory and if the managed systems (network elements) are very large, the known solutions will not even work.

SUMMARY

What is needed is therefore a system with a low memory consumption even if the number of managed object is high or very high. Furthermore a system is also needed wherein the performance is high even if the number of managed objects is high or even very high.

Particularly a system is needed in which resource mapping information between managed objects and resources can be provided in an adequate way without requiring a high memory consumption and advantageously without producing a decrease in performance even if the number of managed objects is high or very high. A system is also needed through which information about sub-trees of a naming tree can be provided in a satisfactory way without requiring a high memory consumption and without leading to a low performance irrespective of whether the managed systems are large or very large, or if the number of managed objects is high.

Furthermore a managed system comprising a number of managed objects is needed wherein both information on resource mapping and information about sub-trees of the naming tree can be provided without requiring too much memory and still maintaining a high performance irrespective of whether the managed system is small or large, or comprises few or even very high numbers of managed objects.

A telecommunications system comprising systems for meeting the above mentioned requirements is also needed as well as a method for providing information on resource mapping and on sub-trees of a naming tree.

Therefore a system comprising a number of managing systems managing a number of managed systems each comprising a number of managed objects of one or more different types is provided wherein the managed objects represent or manage resources. The managed objects are arranged in a naming tree structure and only information related to the type of the managed objects is stored and in order to derive the required instance information, algorithms are used. Particularly the algorithms are used for providing information of the mapping between resources here also called resource object and managed objects and advantageously there is at least one algorithm for each managed object type. The selection of the algorithm to be used may particularly depend on the type of the managed object and advantageously only type data is stored in relation to the managed objects of a managed system. Particularly each managed object has a unique distinguished name and an instance name which is unique within the scope of its superior managed object.

Advantageously, for mapping a distinguished name of a managed object to a resource or a resource object, the algorithm corresponding to the type of the managed object is selected and advantageously the algorithm uses the instance name of the managed object and information of the resource implementation in order to derive which specific resource or resource object that is managed by a given managed object instance. In a particular embodiment, wherein it is desired to retrieve the sub-tree of a given managed object, sub-tree retrievel algorithms are used of which a first is given by the type of the sub-tree root managed object. This is thus in case the sub-tree of a given managed object is needed; however the invention also relates to embodiments wherein this is not wanted. In this case, however, may for each type of managed object a sub-tree of retrieval algorithm be stored and these algorithms are arranged in a managed objects type tree structure. Advantageously, for a sub-tree retrival, the managed object type tree structure is searched from the root and downwards in hierarchy and via the sub-tree retrieval algorithms the corresponding managed object instances are found. In order to deliver the sub-tree comprises the input data advantageously the name and the type of the sub-tree root. A sub-tree retrival algorithm may particularly provide for an iteration over all resource instances corresponding to the type of the managed object and for each identified managed object instance return the instances of a sub-ordinate managed object to the sub-tree retrieval mapping algorithm. However, the use of iteration algorithms merely relates to one particular embodiment and how the algorithms can be used, however a number of other alternatives are also possible.

According to a number of embodiments at least one managed object can manage one resource (i.e. resource object) but one managed object may also manage more than one resource or resource object. Still further one resource or resource object can be managed only by one managed object but it can also be managed by more than one managed object.

In a particular embodiment a managing system comprises an operations system and a managed system comprises a network element. Any system as discussed above may particularly be used in a telecommunications system.

Furthermore a managed system is provided which comprises a number of managed objects of one or more types representing/managing a number of resources. The managed objects are arranged in a naming tree structure comprising the instance names of the managed objects and only data relating to the type of the managed objects is stored and algorithms are used for deriving/providing the information relating to the instance of the managed object resource object that is desired.

The managed system may particularly comprise a network element or still more particularly it may comprise a home location register of a mobile telecommunications system and the types of the managed object may in this case for example relate to subscriber InHlr, msisdnInHlr, basicServiceGroupInHlr etc.

Still further a telecommunications system is provided which comprises a number of managing systems each managing a number of managed systems comprising a number of managed objects representing resources. Managed objects are arranged in a naming tree structure comprising a number of sub-trees, each managed object having a unique distinguished name and an instance name unique within the scope of the superior object and a number different managed object types being provided. Information relating to the type of the managed object is stored and algorithms are used for providing instance information.

Particularly the managing and managed systems respectively of the telecommunication system may comprise operations systems and network elements respectively. Advantageously the algorithms comprise one resource mapping algorithm for each managed object type. Still more particularly the algorithms may comprise one sub-tree retrieval algorithm per managed object type which then may be arranged in a tree structure based on the types of the managed objects. For mapping between managed object and the relevant resource or resource object, the type of the managed object advantageously gives the resource mapping algorithm to be used. Still more particularly, in order to provide a sub-tree of a given managed object the type of the managed object gives the sub-tree retrieval algorithms to be used through which the consecutive relevant sub-tree algorithms are traversed in order to find the managed object instance names.

A method for mapping a managed object of a managed system to a resource managed by the managed object is also provided. It comprises the steps of storing type-related data on the managed object in a storage, selecting a particular resource mapping algorithm corresponding to the type of the managed object, said algorithm using the instance name of the managed object and information on the particular resource implementation to derive the resource instance managed by the managed object instance.

A method is also given for providing information relating to a sub-tree of a naming tree structure in which a managed object of a managed system is arranged. It comprises the steps of storing one sub-tree retrival algorithm for each managed object type in an algorithm tree structure, giving the name and the type of the sub-tree root, and via each sub-tree retrieval algorithm corresponding to a given type finding the instance name of the managed object of that type and inputting the found instance names to the consecutive subordinate sub-tree retrieval algorithms etc. until there are no subordinate managed objects.

BRIEF DESCRIPTION OF THE DRAWINGS

The invention will in the following be further described in a non-limiting way under reference to the accompanying drawings in which.

DETAILED DESCRIPTION

Figure 1:
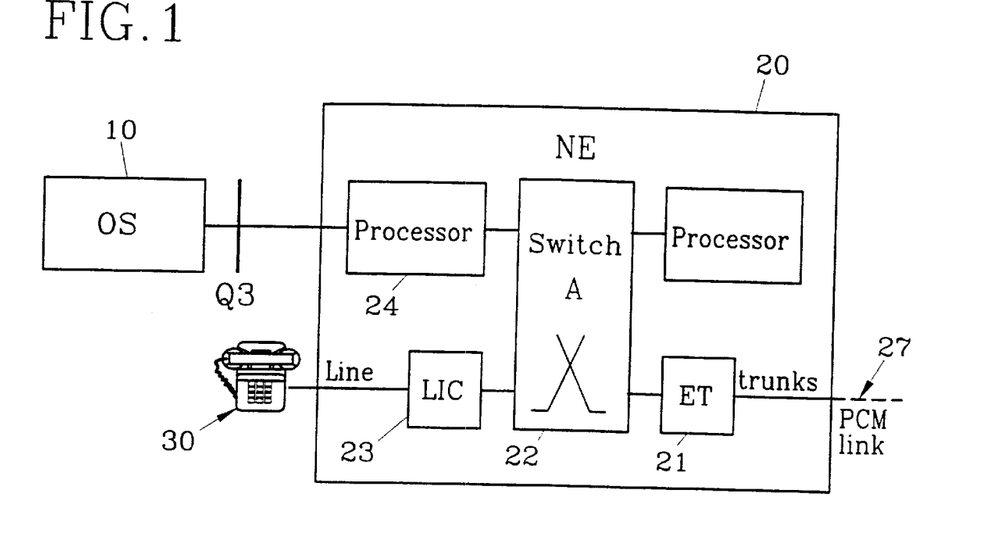
FIG. 1 illustrates an example on a network element interfacing an operations system, FIG. 2 examplifies mapping between managed objects and resources.

FIG. 1 illustrates an example of a managing system in the form of an operations system OS 10 managing a managed system in the form of a network element NE 20 of a telecommunications management network (TMN). The extent of a telecommunications management network (TMN) is standarized in the CCITT Recommendation M.3010, and it may comprise anything between a simple connection between an operations system and a network element and a whole network of operations systems controlling a large telecommunications network. The standardized Q3 interface defines the object oriented information model of the network elements and the communication protocol between the operations systems and the network elements. The Q3 interface is an operator interface for telecommunications systems and via this an operator can do a lot of operations on a managed object, such as for example create a managed object, set a value in a managed object, get a value from a managed object, do an action on a managed object and delete a managed object. A network element provides an operations system with information about changes in managed objects via notifications which after a selection has been done are sent as events on the Q3 interface. This is however not part of the present invention but can be done in any convenient way.

FIG. 1 shows one example on the hardware of a simple network element 20. The network element NE 20 is connected to the rest of the network through an exchange terminal ET 21 which communicates over a PCM link 27. The network element NE 20 is monitored and controlled from the operation system OS 10 which is connected to a processor of the network element. A subscriber station 30 e.g. (a telephone) is via a line connected to a line interface (LIC) 23 which is connected to a switch A 22.

For the controlling and/or monitoring of the NE 20, a number of managed objects have been created.

Figure 2:
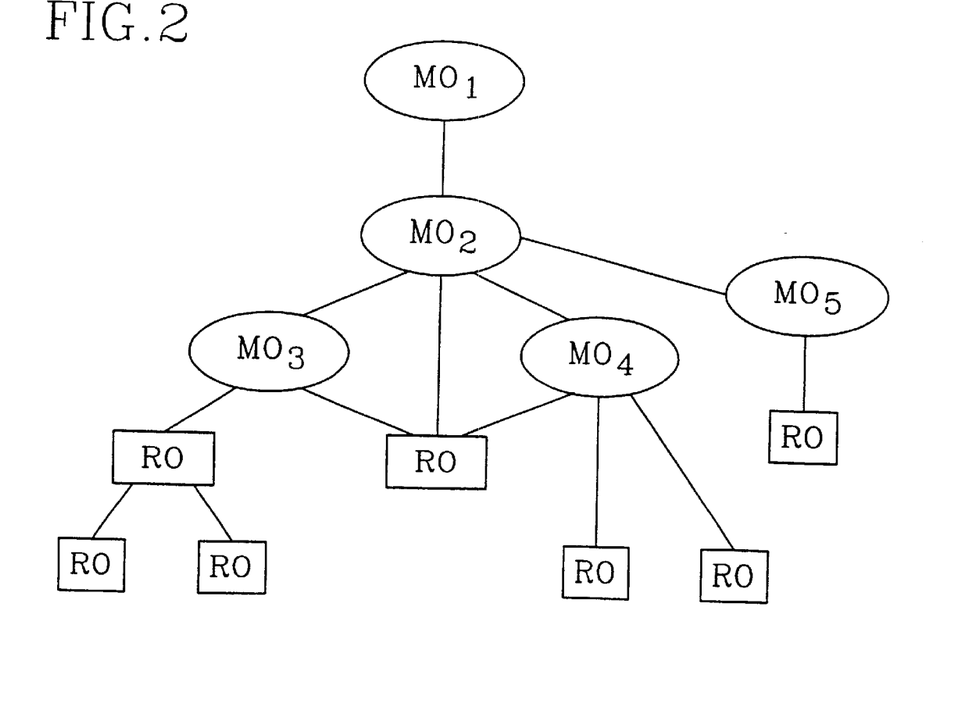

FIG. 2 is a schematical figure (not connected to the above-mentioned embodiment) intended to illustrate a number of mapping alternatives between managed object and resources or resource objects RO. This schematical figure both illustrates that a managed object $MO_1$ can represent another managed object $MO_2$ or that one managed object $MO_2$ can represent more than one other managed object (see e.g. CCITT rec. M3010 ch.3), here managed objects $MO_3$, $MO_4$, $MO_5$, i.e. that one managed object represents one or more other managed objects and that two or more managed objects may represent different views of one resource or one resource object, see for example managed objects $MO_3$, $MO_4$ both representing one and the same resource object. Furthermore, one managed object may represent a combination of resource objects, see e.g. $MO_3$ which represents a combination of resources and $MO_4$ representing three resource objects. The invention is applicable to any combination or separate part as illustrated by this figure as well as other mapping cases.

Figure 3:
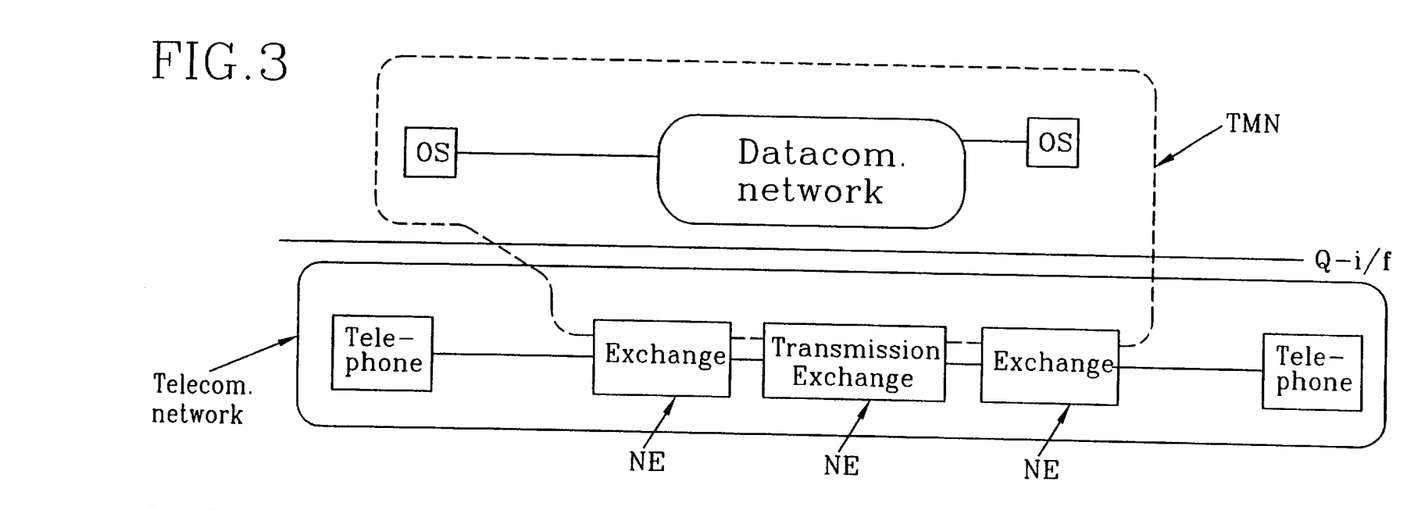
FIG. 3 is a schematical view of a telecommunications management network, FIG. 4 gives an example on managed objects in a network element of a telecommunications system.
Figure 4:
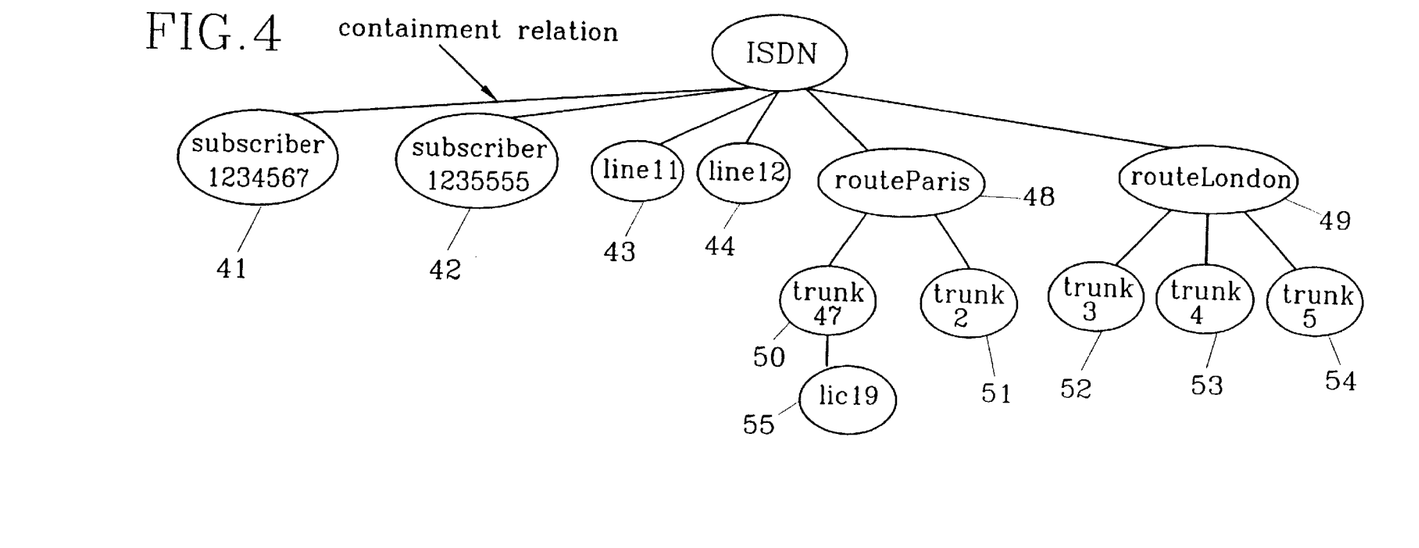

FIG. 3 is a simplified illustration of a telecommunications management network TMN comprising network elements, here an exchange and transmission systems and operations systems. FIG. 4 again refers to the embodiment of FIG. 1 Subscriber data for two subscribers is contained in two subscriber managed objects 41, 42. The subscriber managed objects can be connected to line-managed objects 43, 44, here line 11, line 12 representing the subscriber-line connection data. The speech channels of the PCM link are represented by trunk managed objects 50–54. In the illustrated network element NE trunk 47 and trunk 2 are members of the route to Paris, trunks 3, 4 and 5 are members of a route to London, route Paris and route London indicating route managed objects 48, 49. Of course there are also other trunks in a PCM link but they are not used in this simplified illustration of a network element. Lic managed object 19 is a member of trunk MO 50 (trunk 47). Since in the management view of switching network elements the number of managed objects may be very high, for example even up to a number of millions, the managed objects are kept or arranged in a naming tree also referred to as a management information tree (MIT). It will however be clear that even if the number of managed objects is lower, they are arranged in a naming tree. FIG. 4 is one example on a naming tree for the management view of the network element. All managed objects are given an instance name upon creation. All managed objects that are "children" of one and the same managed object have different instance names but an instance name need not be unique within the naming tree but one or more managed objects can have the same instance name on condition that they have different "parents" as discussed earlier in the application.

However, every managed object also has a name that is unique within the managed system through which the managed object thus can be exactly identified. This name is called a distinguished name DN. The distinguished naming starts from the root of the naming tree and ends with the instance name of the managed object. This can for example be compared with a UNIX full path name one of which for example reading as follows:

Distinguished Name
DN ={application=ISDN/route=routeLondon/trunk= trunk5}

ISDN refers to Integrated Services Digital Network. As also discussed above, a managed object situated immediately below another managed object in the naming tree is called the subordinate managed object of the other object. The latter object is then referred to as the superior managed object. The collection of all managed objects in a network element NE is called the management information base (MIB). The management information base is an abstract standard concept and it is not the same as a physical database. The latter can for example can be used to store resource data within a network element.

Figure 5:
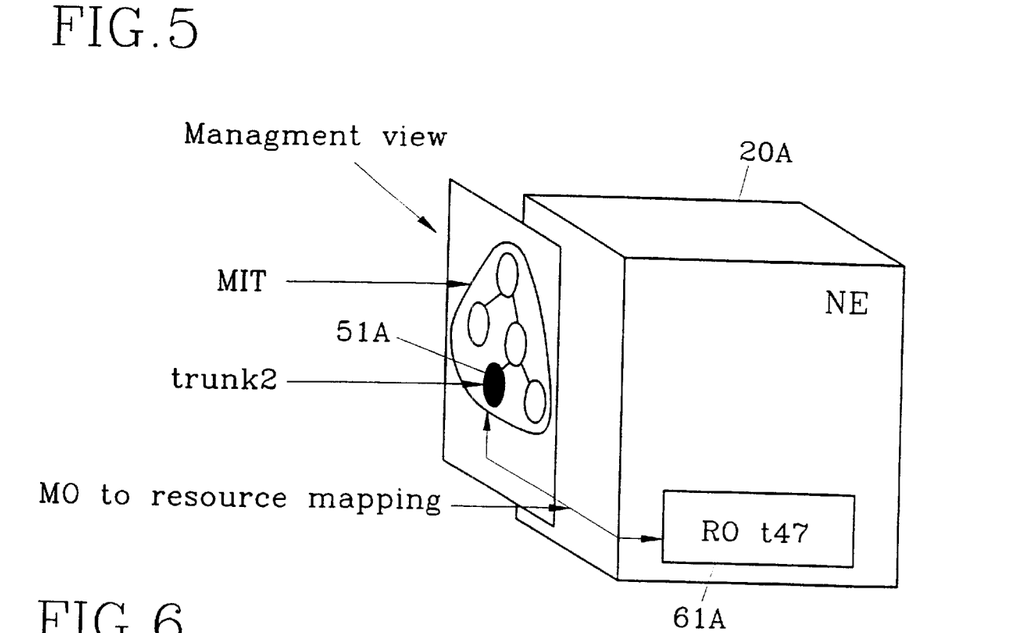
FIG. 5 illustrates a managed object of type trunk representing a trunk resource.

FIG. 5 illustrates a network element 20A and a management view thereof. If for example an operator interacts with managed objects, the acutal traffic resources in the network element NE are manipulated. FIG. 5 illustrates a trunk managed object 52 representing a trunk resource. A trunk managed object trunk 2 acts as an interface to the resource object 61A, i.e. "to the real trunk resource t47" which is used to carry a telephone call in one direction. In order to enable manipulation of the resource, a mapping of the external name, i.e. the distinguished name DN to an internal name, i.e. the name of the resource or the resource object RO, has to be done. For management operations at least resource mapping information is required. Information about sub-trees of the naming tree is required in some operations. According to the invention resource mapping and/or sub-tree retrieval is done by the use of a number of different algorithms. Which algorithms to be used, is given by the type of the managed object. Therefore it is only required that type data on managed objects is stored and no instance data storing is required.

Under reference to FIG. 6 mapping between managed objects and resources will be explained. The algorithms that are used are denoted naming tree algorithms NTA and more specifically they are denoted naming tree algorithms for resource mapping $NTA_R$.

In the illustrated embodiment it is supposed that there are four different types of managed objects, namely trunk managed objects, subscriber managed objects, route managed objects and line managed objects. Moreover there are supposed to be 48 different trunk resource objects t1, . . . , t48. There are further supposed to be a number of resources relating to subscriber route, line MOs which however are not illustrated in the FIG.

In every management operation the distinguished name DN of the MO as well as the MO type is included. In order to enable the execution of the management operation in the system, the mapping between the external view, i.e. the management view and the internal view, i.e. the resources is required. In the present embodiment the MO type is used to select the appropriate mapping algorithm which knows what type of resources that each specific MO type is managing.

The algorithm then uses the MO instance name together with knowledge about the resource implementation to derive which specific resource instances that are managed by the MO instance. The mapping is arbitrary and, it may be quite complicated among others because one MO may manage several different resources and one resource can be managed by a number of MOs etc. as explained above in relation to FIG. 2.

Figure 6:
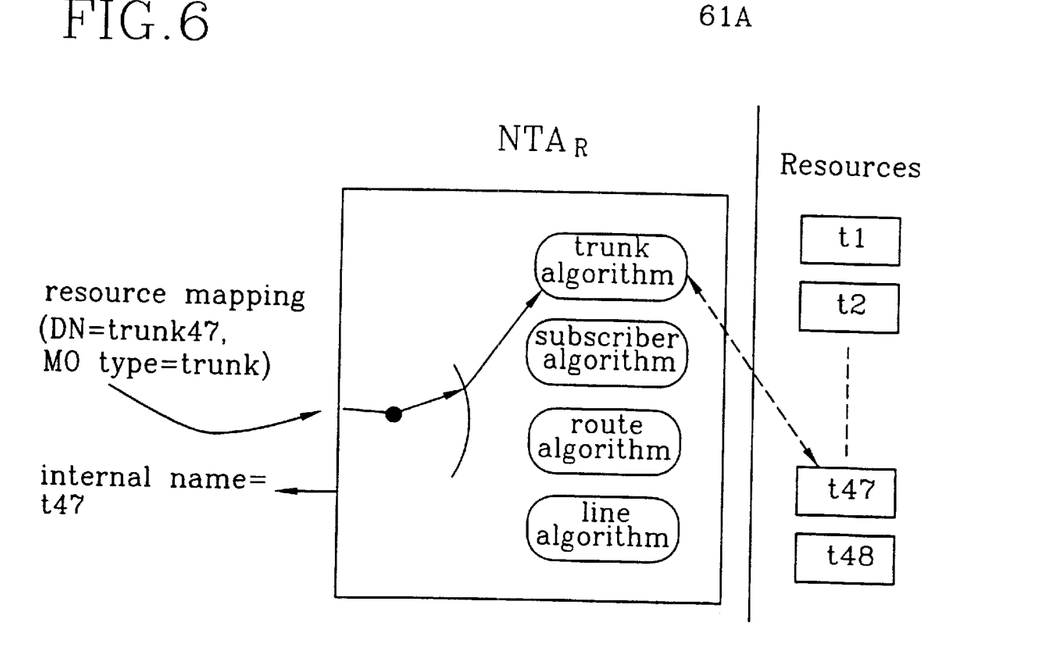
FIG. 6 illustrates selection of resource mapping algorithm and FIG. 7 illustrates selection of sub-tree retrival algorithm.

In FIG. 6 the MO type trunk e.g. manages database objects and therefore each MO instance of type trunk manages one database object instance. It should however be understood that a MO can manage any kind of resources. Examples on resources are files, processes and hardware etc. Furthermore, the concept of using the naming tree algorithms does in no way depend on what kind of a resource the MOs are managing.

It is a particular advantage of the invention that, as far as mapping of resources is concerned (i.e. mapping between managed objects and resources), the performance is even independent of the number of MO instances.

In the embodiment according to FIG. 6 the input to the naming tree algorithms $NTA_R$ comprises the distinguished name of the MO instance, i.e. here ISDN/route Paris/trunk 47 (see FIG. 4), together with the MO type identification, i.e. trunk. Using the MO type identification, the naming tree algorithms $NTA_R$ selects the trunk algorithm and forwards the distinguished name DN to the mapping algorithm. The trunk algorithm, which knows how MOs of type trunk have instantiated the corresponding resources then derives the database object identifier from the distinguished name DN. In the illustrated embodiment, the algorithm creates the internal name by extracting 47 out of trunk 47 and concatenating t with 47. (This is however merely a simplified example on an algorithm.) Finally the naming tree algorithms $NTA_R$ returns t47 as the mapping result. This means that the internal name is t47.

Figure 7:
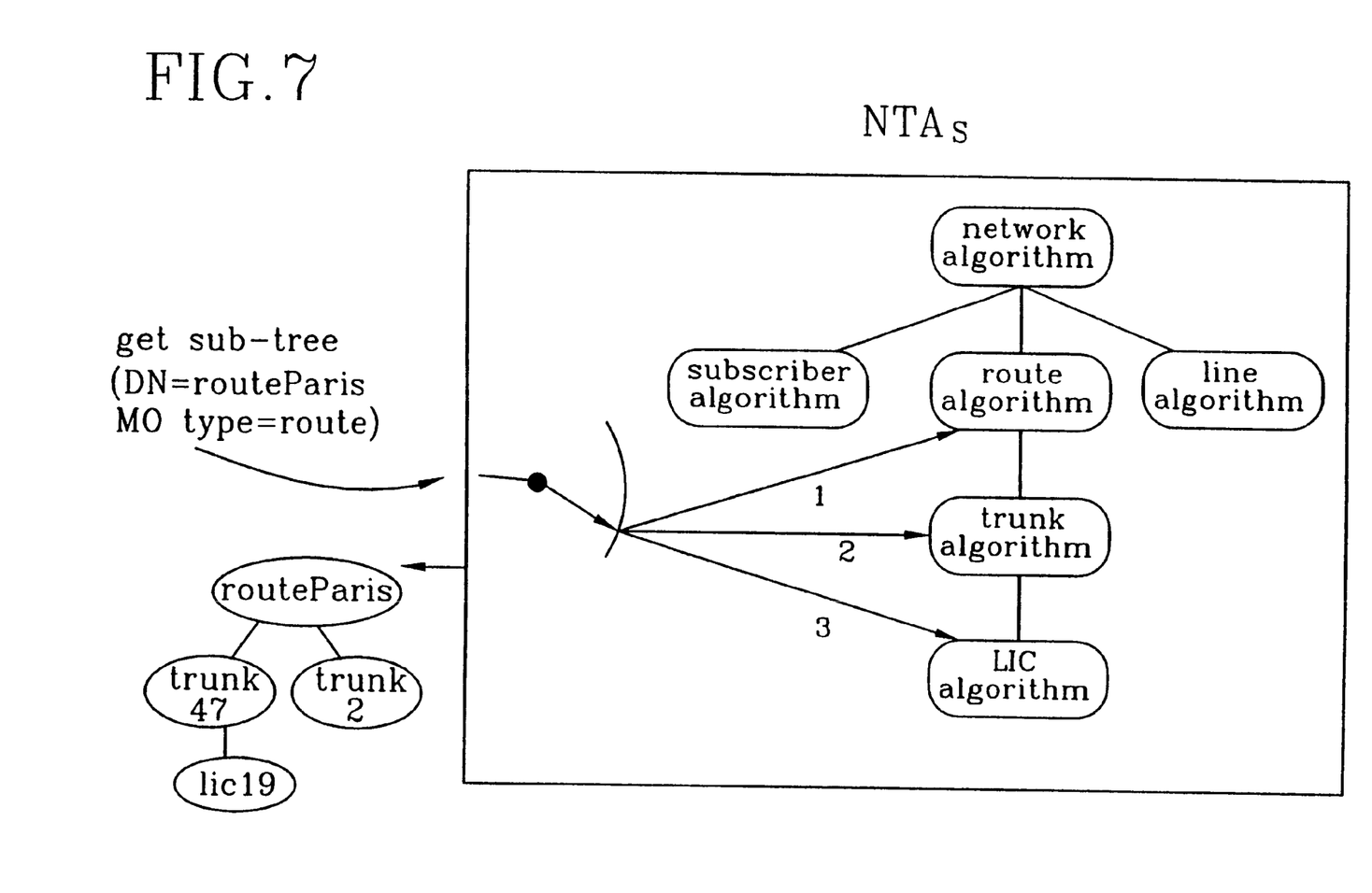

FIG. 7 illustrates an example on providing information on sub-trees of the naming tree. To enable the retrieval of sub-trees, the naming tree algorithms comprises a number of sub-tree retrieval algorithms $NTA_S$, one sub-tree retrieval algorithm for each managed object type, which are arranged in a tree structure. This tree structure corresponds to a possible naming scheme as defined by the name bindings, i.e. a tree of MO types as opposed to the actual naming tree which comprises MO instances as discussed above. For each sub-tree request the possible sub-tree is traversed and each MO type algorithm, i.e. sub-tree retrieval algorithm, finds the corresponding actual MO instances.

The embodiment illustrated in FIG. 7 will now be discussed more in detail. The naming tree algorithms are here requested to deliver a sub-tree of the naming tree. The name and the type of the sub-tree root is specified as input to the naming tree algorithms NTA, namely route Paris and route respectively. The naming tree algorithms NTA uses a sub-tree of algorithms. The route algorithm is in this case the root whereas the trunk algorithm is the only branch of the root algorithm and the LIC algorithm is the only leaf (i.e. the last algorithm) contained within the route sub-tree. The naming tree algorithm then traverses the sub-tree as follows:

The naming tree algorithms first retrieves the sub-tree, route algorithm (1). When route Paris is input to the trunk algorithm, trunk 47 and trunk 2 are returned. The result may for example be derived by iterating over all resource instances corresponding to the MO type. The instances which are to be returned are only the ones having route Paris as a superior MO instance. The algorithm must then have knowledge about the mapping between the MO instance and the resource instances as discussed above under reference to FIG. 6 corresponding to (2) in FIG. 5. Finally, for each of the identified superior MO instances, i.e. here trunk 47 and trunk 2, the LIC algorithm returns all the subordinate MO instances. If trunk 47 is input to the algorithm, lic 19 is returned. If trunk 2 is input, nothing is returned since trunk 2 has no subordinate MO instance.

A particular embodiment of the invention relates to a network element comprising a home location register for a mobile communication system such as for example the GSM system.

The invention is of course not limited to the shown embodiments but it may include any type of managed objects or any number of types of managed objects as well as any number of managed objects which may be arranged in any manner as discussed and e.g. exemplified in a general manner above in relation to FIG. 2. Moreover the resources may be of any kind and of any number and particularly they may be seen as resource objects RO.

The invention also relates to systems only containing either algorithms for resource mapping or algorithms for sub-tree retrieval algorithms. Most advantageously the invention relates to systems wherein algorithms are used both for resource mapping and for sub-tree retrieval.

Moreover the invention is not limited to telecommunications systems but it can be applied also in any kind of datacommunication systems comprising managing systems managing managed systems.

What is claimed is:

1. System comprising a number of managing systems managing a number of managed systems each comprising a number of managed objects of a number of different types representing/managing a number of resources, the managed objects being arranged in a tree structure with a root and a number of sub-trees, each managed object having an instance name which is unique within the scope of its superior managed object, wherein data on the types of the managed objects are stored, and whereas algorithms are exclusively used to derive instance information, with the algorithms corresponding to the types of the managed objects.

2. System according to claim 1, wherein algorithms are used for providing information on a mapping between resources and managed objects.

3. System according to claim 2, wherein there is at least one algorithm per managed object type.

4. System according to claim 1, wherein a selection of the algorithm to be used depends on the type of the managed object.

5. System according to claim 1, wherein only type data is stored in relation to the managed objects in a managed system.

6. System according to claim 1, wherein each managed object has a unique distinguished name.

7. System according to claim 1, wherein for mapping a distinguished name of a managed object to a resource, the algorithm that corresponds to the type of the managed object is selected.

8. System according to claim 5, wherein algorithm uses the instance name of the managed object and information on the resource implementation to derive which specific resource is managed by a given managed object instance.

9. System according to claim 1, wherein for retrieving the sub-tree of a given managed object, sub-tree retrieval algorithms are used of which the first is given by the type of the sub-tree root managed object.

10. System according to claim 9, wherein for each type of managed object a sub-tree retrieval algorithm is stored, which algorithms are arranged in a managed object type tree structure.

11. System according to claim 9, wherein for sub-tree retrieval the managed object type tree structure is searched from the root and downwards in hierarchy and in that via the sub-tree retrieval algorithms the corresponding managed object instances are found.

12. System according to claim 8, wherein for sub-tree delivery, input data comprises the name and the type of the sub-tree root.

13. System according to claim 12, wherein a sub-tree retrieval algorithm provides for an iteration over all resource instances corresponding to the type of the managed object and for each identified managed object instance returns the instances of a subordinate managed object to the sub-tree retrieval mapping algorithm.

14. System according to claim 1, wherein at least one managed object manages one resource.

15. System according to claim 1, wherein at least one managed object manages more than one resource.

16. System according to claim 1, wherein at least one resource is managed only by one managed object.

17. System according to claim 1, wherein at least one resource is managed by more than one managed object.

18. System according to claim 1, wherein a managing system is an operations system and the managed system is a network element.

19. The system according to claim 18, wherein the system is included in a telecommunications system.

20. Telecommunications system comprising a number of managing systems each managing a number of managed systems comprising a number of managed objects representing resources or resource objects, the managed objects being arranged in a naming tree structure comprising a number of sub-trees, each managed object having a unique distinguished name and an instance name unique within the scope of its superior object, the managed objects further being of a number of different types, wherein only information relating to the type of the managed objects is stored in storing means and algorithms are exclusively used for providing instance information, with the algorithms corresponding to the types of the managed objects.

21. Telecommunication system according to claim 20, wherein the managing systems and the managed systems comprise operation systems and network elements respectively.

22. Telecommunication system according to claim 20, wherein the algorithms comprise one resource mapping algorithm for each type of managed object.

23. Telecommunication system according to claim 20, wherein the algorithms comprise one sub-tree retrieval algorithm per managed object type and the sub-tree retrieval algorithms are arranged in a tree structure based on the types of the managed objects.

24. Telecommunication system according to claim 22, wherein for mapping between a managed object and the relevant resource, the type of the managed object gives the resource mapping algorithm to be used.

25. Telecommunication system according to claim 23, wherein for providing a sub-tree of a given managed object, the type of the managed object gives the sub-tree retrieval algorithms to be used through which the consecutive relevant sub-tree algorithms are traversed in order to find the managed object instance names.

26. A managed system comprising a number of managed objects of one or more types representing/managing a number of resources, the managed objects being arranged in a naming tree structure comprising the instance names of the managed objects, wherein only data relating to the type of the managed objects is stored and algorithms are exclusively used to provide information relating to the instance of the managed objects, with the algorithms corresponding to the types of the managed objects.

27. A managed system according to claim 26, further comprising a Home Location Register of a mobile telecommunications system.

28. A managed system according to claim 27, wherein the types of the managed objects relate to the home location register.

29. Method for mapping a managed object of a managed system to a resource managed by the managed object, comprising the steps of:

storing type related data on the managed object in a storage; and selecting a particular resource mapping algorithm corresponding to the type of the managed object, said algorithm being selected from an algorithm tree structure and using the instance name of the managed object and information on the particular resource implementation to derive the resource instance(s) managed by the managed object instance.

30. Method for providing information relating to a sub-tree of a naming tree structure in which a managed object of a managed system is arranged, comprising the steps of:

storing one sub-tree retrieval algorithm for each managed object type in an algorithm tree structure;

giving the name and type of the sub-tree root, each sub-tree retrieval algorithm corresponding to a given type finding the instance names of the managed object of that type; and inputting the found instance names to the consecutive subordinate sub-tree retrieval algorithms until there are no subordinate managed objects.

* * * * *